(12) United States Patent
Newville (10) Patent No.: US 7,729,691 B2
(45) Date of Patent: Jun. 1, 2010

(54) INFORMATION PORTAL (75) Inventor: Todd A. Newville, Shrewsbury, MA (US)

(73) Assignee: Gannett Satellite Information Network, Inc., McLean, VA (US)

(*) Notice: Subject to any disclaimer, the term of this patent is extended or adjusted under 35 U.S.C. 154(b) by 1433 days.

(21) Appl. No.: 09/843,536

(22) Filed: Apr. 25, 2001

(65) Prior Publication Data

US 2002/0004387 A1    Jan. 10, 2002

Related U.S. Application Data

(60) Provisional application No. 60/199,528, filed on Apr. 25, 2000.

(51) Int. Cl.
    *H04M 3/00*    (2006.01)
(52) U.S. Cl. ............... 455/420; 455/418; 455/41.2; 455/414.3; 455/456.3; 455/3.06; 455/569.2; 455/575.1; 705/14; 370/328; 370/338; 709/203; 340/995.1; 187/247
(58) Field of Classification Search ... 455/426.1–426.2, 455/414.1, 412.1, 41.1–41.3, 560–561, 555, 455/418–421, 41, 422.1, 552.1, 553.1, 414.3, 455/456.3, 410–411; 709/219, 218, 203–206; 704/275; 370/338, 328; 187/391, 396, 247–248; 340/5.2, 995.1; 707/5
    See application file for complete search history.

(56) References Cited

U.S. PATENT DOCUMENTS

| | | | | |
|---|---|---|---|---|
| 4,673,911 A | * | 6/1987 | Yoshida | .................. 187/380 |
| 4,709,788 A | * | 12/1987 | Harada | .................. 187/382 |
| 4,879,755 A | * | 11/1989 | Stolarczyk et al. | ............ 725/41 |
| 4,958,707 A | | 9/1990 | Yoneda et al. | |
| 4,979,593 A | * | 12/1990 | Watanabe et al. | ........... 187/245 |
| 5,010,472 A | | 4/1991 | Yoneda et al. | |
| 5,218,344 A | * | 6/1993 | Ricketts | .................. 340/573.4 |
| 5,373,503 A | | 12/1994 | Chen | |
| 5,539,395 A | * | 7/1996 | Buss et al. | .................. 340/7.43 |
| 5,554,832 A | * | 9/1996 | Lumme et al. | ............. 187/380 |
| 5,579,535 A | * | 11/1996 | Orlen et al. | ................. 455/421 |
| 5,655,219 A | | 8/1997 | Jusa et al. | |
| 5,706,331 A | * | 1/1998 | Wang et al. | ............. 455/426.1 |
| 5,752,186 A | * | 5/1998 | Malackowski et al. | ... 455/414.1 |
| 5,832,363 A | * | 11/1998 | Moriya et al. | ............. 455/11.1 |
| 5,920,287 A | * | 7/1999 | Belcher et al. | ............. 342/450 |
| 5,955,710 A | * | 9/1999 | DiFranza | .................... 187/396 |
| 6,073,075 A | * | 6/2000 | Kondou et al. | ............. 701/203 |

(Continued)

FOREIGN PATENT DOCUMENTS

GB    2340336    2/2000

(Continued)

OTHER PUBLICATIONS

PCT International Search Report, EPO, Jun. 10, 2002.

*Primary Examiner*—Sharad Rampuria
(74) *Attorney, Agent, or Firm*—Occhiuti Rohlicek & Tsao LLP (57) ABSTRACT

A communication system for providing high-speed wireless access to mobile processing systems a stationary transceiver defining an information portal in its immediate vicinity. A local server in communication with this stationary transceiver is configured to respond to a mobile processing-system present within the information portal.

19 Claims, 4 Drawing Sheets

U.S. PATENT DOCUMENTS

| | | | |
|---|---|---|---|
| 6,091,956 A * | 7/2000 | Hollenberg | 455/456.5 |
| 6,109,396 A * | 8/2000 | Sirag et al. | 187/381 |
| 6,202,799 B1 * | 3/2001 | Drop | 187/388 |
| 6,209,685 B1 * | 4/2001 | Zaharia et al. | 187/392 |
| 6,219,696 B1 * | 4/2001 | Wynblatt et al. | 709/218 |
| 6,223,027 B1 * | 4/2001 | Ono et al. | 455/412.1 |
| 6,223,160 B1 * | 4/2001 | Kostka et al. | 704/275 |
| 6,397,040 B1 * | 5/2002 | Titmuss et al. | 455/67.11 |
| 6,405,033 B1 * | 6/2002 | Kennedy et al. | 455/414.1 |
| 6,408,307 B1 * | 6/2002 | Semple et al. | 707/104.1 |
| 6,418,327 B1 * | 7/2002 | Carey et al. | 455/562.1 |
| 6,473,609 B1 * | 10/2002 | Schwartz et al. | 455/406 |
| 6,526,275 B1 * | 2/2003 | Calvert | 455/418 |
| 6,587,835 B1 * | 7/2003 | Treyz et al. | 705/14.64 |
| 6,615,175 B1 * | 9/2003 | Gazdzinski | 704/275 |
| 6,647,269 B2 * | 11/2003 | Hendrey et al. | 455/456.3 |
| 6,647,270 B1 * | 11/2003 | Himmelstein | 455/456.1 |
| 6,650,902 B1 * | 11/2003 | Richton | 455/456.3 |
| 6,657,538 B1 * | 12/2003 | Ritter | 340/5.81 |
| 6,690,932 B1 * | 2/2004 | Barnier et al. | 455/414.1 |
| 6,714,791 B2 * | 3/2004 | Friedman | 455/456.1 |
| 6,760,595 B2 * | 7/2004 | Inselberg | 455/517 |
| 6,778,834 B2 * | 8/2004 | Laitinen et al. | 455/450 |
| 6,782,253 B1 * | 8/2004 | Shteyn et al. | 455/414.1 |
| 6,801,792 B1 * | 10/2004 | Schuster et al. | 455/566 |
| 6,834,195 B2 * | 12/2004 | Brandenberg et al. | 455/456.3 |
| 6,856,820 B1 * | 2/2005 | Kolls | 455/575.9 |
| 6,882,313 B1 * | 4/2005 | Fan et al. | 342/457 |
| 6,925,288 B2 * | 8/2005 | McDonnell et al. | 455/41.2 |
| 6,937,998 B1 * | 8/2005 | Swartz et al. | 705/26 |
| 6,968,178 B2 * | 11/2005 | Pradhan et al. | 455/414.1 |
| 6,970,871 B1 * | 11/2005 | Rayburn | 707/10 |
| 6,983,139 B2 * | 1/2006 | Dowling et al. | 455/414.2 |
| 6,999,779 B1 * | 2/2006 | Hashimoto | 455/456.2 |
| 7,003,283 B2 * | 2/2006 | Hiltunen et al. | 455/412.1 |
| 7,019,620 B2 * | 3/2006 | Bohler et al. | 340/310.17 |
| 7,020,439 B2 * | 3/2006 | Sinivaara et al. | 455/41.2 |
| 7,043,231 B2 * | 5/2006 | Bhatia et al. | 455/412.1 |
| 7,116,985 B2 * | 10/2006 | Wilson et al. | 455/456.1 |
| 7,149,533 B2 * | 12/2006 | Laird et al. | 455/456.3 |
| 7,162,233 B2 * | 1/2007 | Chiba | 455/420 |
| 7,174,173 B1 * | 2/2007 | Needham et al. | 455/456.2 |
| 7,224,979 B2 * | 5/2007 | Singhal et al. | 455/456.1 |
| 7,242,925 B2 * | 7/2007 | O'Neil et al. | 455/414.1 |
| 7,286,816 B2 * | 10/2007 | Rekinen | 455/411 |
| 7,343,317 B2 * | 3/2008 | Jokinen et al. | 705/14.64 |
| 7,463,890 B2 * | 12/2008 | Herz et al. | 455/445 |
| 7,474,874 B2 * | 1/2009 | Lahetkangas et al. | 455/41.2 |
| 2002/0010000 A1 * | 1/2002 | Chern et al. | 455/517 |
| 2002/0022488 A1 * | 2/2002 | Srinivasan et al. | 455/456 |
| 2002/0183059 A1 * | 12/2002 | Noreen et al. | 455/427 |
| 2003/0027555 A1 * | 2/2003 | Malackowski et al. | 455/414 |
| 2003/0083045 A1 * | 5/2003 | Blight et al. | 455/412 |
| 2003/0216145 A1 * | 11/2003 | Cox et al. | 455/456.1 |
| 2004/0048622 A1 * | 3/2004 | Witkowski et al. | 455/456.6 |

FOREIGN PATENT DOCUMENTS

| | | | |
|---|---|---|---|
| GB | 2340336 A | * | 2/2000 |
| JP | 4-125274 | | 4/1992 |
| JP | 5-70050 | | 3/1993 |

* cited by examiner

INFORMATION PORTAL

RELATED APPLICATIONS

This application claims the benefit of the priority date of U.S. provisional application 60/199,528, filed on Apr. 25, 2000, the contents of which are herein incorporated by reference.

FIELD OF INVENTION

This invention relates to communication systems, and in particular, to wireless communication systems.

BACKGROUND

Mobile processing-systems, such as portable computers and personal digital assistants, are often provided with the ability to establish wireless connections with other processing systems. Such wireless connections enable a user to access internet sites while traveling. A user thus equipped is able to obtain real-time information from an internet site and to act immediately on the basis of that information. For example, a user on the way to the airport may use a mobile processing-system to discover that a flight has been cancelled and that it may be preferable to simply turn around and go home.

As a practical matter, however, it is difficult for a user of a mobile processing-system to conveniently acquire timely information while traveling. The process of identifying and accessing a web site can be cumbersome and difficult to attend to while coping with the exigencies of travel. In addition, the speed of wireless data transmission is itself limited by numerous physical constraints. For example, high-speed data transmission requires high bandwidth. Such bandwidth may not be available simply because a finite spectrum must be shared by many channels. Inadequate signal-to-noise ratio, resulting from noise or multi-path reflections, can result in high error rates, which in turn require frequent retransmission of data packets.

SUMMARY

A system according to the invention provides high-speed wireless communication to a mobile processing system. The system maintains one or more information portals that provide high-speed wireless access to a local area network. Because of the limited spatial extent of an information portal, a low-power but high-bandwidth channel can be maintained within the information portal. Within the limited spatial extent of the information portal, wireless data communication is established at rates much higher than those available in those wireless data communication systems that provide wireless data communication over public airwaves.

A communication system incorporating the invention includes a stationary transceiver defining an information portal in its immediate vicinity. A local server in communication with this stationary transceiver is configured to respond to a mobile processing-system present within the information portal.

Typically, the local server is configured to perform a function on the basis of the identity of the mobile processing-system. This function might be to provide selected data to the mobile processing-system, to provide interactive access to a computer network, or to perform various functions associated with the operation of a building that houses the stationary transceiver. Examples of such functions include permitting building access to a portion of the building, or controlling an elevator in the building.

In one aspect of the invention, the local server is configured to establish a communication link between the mobile processing-system in the information portal and a selected location. The communication link can be an audio link, a video link, or a two-way communication link.

Various types of transceivers can be used as stationary transceivers. For example, the stationary transceiver can be a radio transceiver, an optical transceiver, an infrared transceiver, and an acoustic transceiver.

Information is communicated to the mobile processing system when the mobile processing system is within an information portal. Consequently, the stationary transceiver, and hence the information portal that it maintains, is deployed at locations in which commuters or travelers are expected to linger momentarily. Such locations include elevators, elevator lobbies, waiting areas at transportation nodes, for example train platforms at train stations, airplane gate areas at airports, and even the transportation vehicles themselves.

In another embodiment, the communication system also includes a fulfillment server in communication with the local server. The fulfillment server has access to a wide area network. The wide area network can be a global computer network, such as the internet.

The fulfillment server can include a user-interface to enable a user to specify certain actions. Examples of such actions include making selected information available for transmission to a mobile processing system at an information portal, or requesting that the fulfillment server send, to the mobile processing system, a message indicating the occurrence of a selected event.

In one aspect of the invention, the fulfillment server is configured to provide interactive services to the mobile processing system while the mobile processing system is in an information portal. Examples of such interactive services include email or internet access.

To enhance performance, it is useful to provide a cache at the local server. Such a cache is used to accumulate information intended to be transmitted to a mobile processing system. This information remains in cache until the mobile processing system enters an information portal. Once the mobile processing system for which the accumulated information is intended enters an information portal, the information in cache is relayed to the mobile processing system.

In another embodiment, the communication system includes a plurality of stationary transceivers, each configured for wireless communication with a mobile processing system present in a corresponding information portal; and a server system in communication with each of the stationary receivers. The server system has a link to a global computer network. This enables the server system to provide the mobile processing system with wireless access to the global computer network The invention also includes a method for providing a mobile processing system with wireless access to a global computer network. The method includes maintaining an information portal and establishing wireless communication between the mobile processing system and a server system following entry of the mobile processing system into the information portal. Once communication has thus been established, a link between the server system and the global computer network is provided.

Unless otherwise defined, all technical and scientific terms used herein have the same meaning as commonly understood by one of ordinary skill in the art to which this invention belongs. Although methods and systems similar or equivalent to those described herein can be used in the practice or testing of the present invention, suitable methods and systems are described below. All publications, patent applications, patents and other references mentioned herein are incorporated by reference in their entirety. In case of conflict, the present specification, including definitions, will control. In addition, the systems, methods, and examples are illustrative only and not intended to be limiting.

Other features and advantages of the invention will be apparent from the claims and from the following detailed description and its accompanying figures.

DETAILED DESCRIPTION

Figure 1:
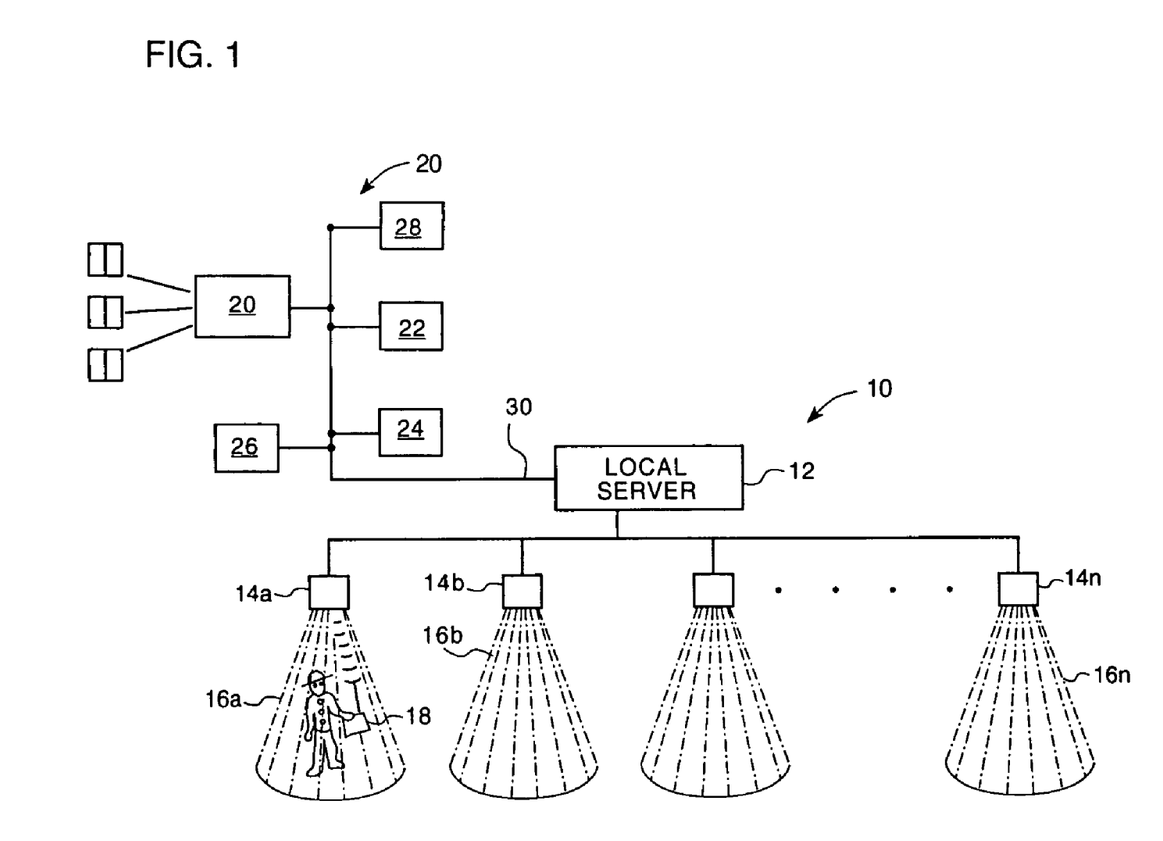
FIG. 1 is a communication system incorporating the invention.

Referring to FIG. 1, a communication system 10 incorporating the invention includes a local server 12 in data communication with one or more stationary transceivers 14a-n across a private network. Each stationary transceiver 14a-n maintains a corresponding information portal 16a-n extending around a vicinity thereof. When a person carrying a mobile processing-system 18, for example a portable computer or a portable digital-assistant, enters one of these information portals 16a, the stationary transceiver 14a maintaining that information portal 16a establishes wireless communication between the local server 12 and the mobile processing-system 18.

The mobile processing-system 18 and the stationary transceiver 14a can establish wireless communication by transmitting and receiving electromagnetic waves or acoustic waves modulated by data. In the case of electromagnetic waves, the waves can be radio-frequency waves, infrared waves, optical waves, or electromagnetic waves having any other frequency suitable for short-range data-communication. Acoustic waves are typically ultrasonic or mega sonic waves.

In the case of radio-frequency waves, the establishment of the communication link can be completely passive, with no action required of the person other than entry into the information portal 16a. In the case of infrared or optical waves, or other waves having wavelengths much shorter than nearby scattering structures, the person establishes communication by pointing a port on the mobile processing-system 18 toward the stationary transceiver 14a.

The stationary transceivers 14a-n can be deployed within a building in conjunction with elevator displays and lobby displays as described in pending U.S. application Ser. Nos. 09/123,284 and 09/465,504, the contents of which are incorporated by reference. This deployment is advantageous because the display can then be used to communicate information to the person carrying the mobile processing-system 18. In addition, the display is already in data communication with the local server 12 and can therefore be easily modified to accommodate the stationary transceiver 14a. However, stand-alone stationary transceivers 14a-n can also be deployed at various locations without the presence of a nearby display.

Stationary transceivers 14a-n are typically deployed at locations in which commuters and other travelers are likely to linger in the course of their travel. This ensures that the person is in an information data portal 16a-n long enough for meaningful data transmission to occur.

The local server 12 is also connected to one or more peripheral devices 20. Such peripheral devices can include elevator control system 22, building security systems 24, building communication systems 26, building environmental-control-systems 28, and other systems that govern additional aspects of building functionality. These connections enable the local server 12 to control building functions in response to the identity and movement of a person carrying a mobile processing-system.

A local area network 30 links the local server 12, the peripheral devices, and the stationary transceivers 14a-n. These links can be wired links, wireless links, or a mixture of both wired and wireless links.

In operation, a person carrying a mobile processing-system 18 enters one of the information portals 16a-n. The mobile processing-system 18 and the stationary transceiver 14a then establish communication, thereby providing a data path between the local server 12 and the mobile processing-system 18. This enables the local server 12 to identify the mobile processing-system 18. The local server 12 can then interact with the peripheral devices in a manner consistent with the identity of the mobile processing-system 18.

Figure 2:
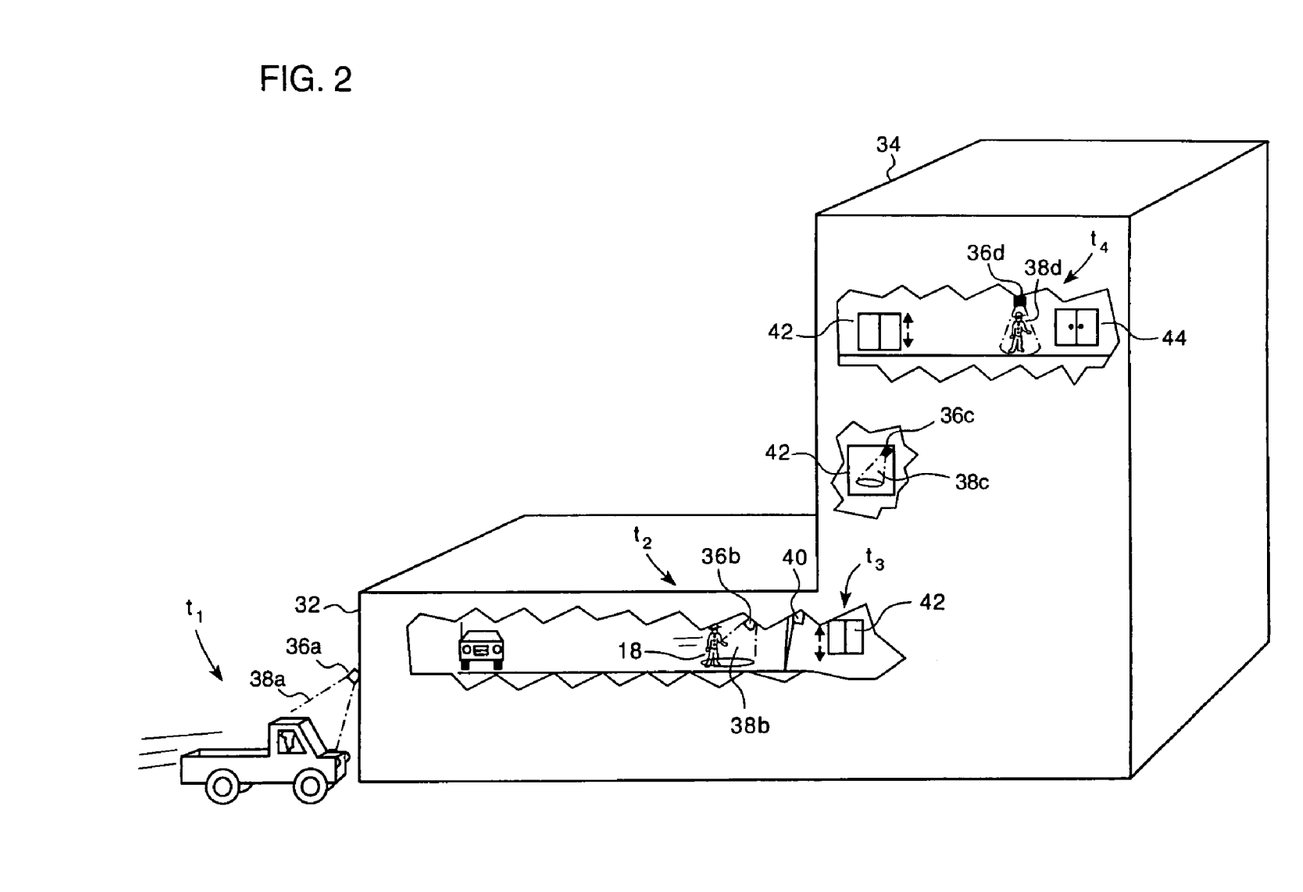
FIG. 2 illustrates an application of the communication system of FIG. 1.

To illustrate examples of some of the various types of interaction that are possible, it is instructive to follow the activities of a typical building tenant upon arrival at the building. FIG. 2 illustrates the progress of a tenant who, at time $t_1$, enters a parking lot 32 adjacent to a building 34.

Throughout this detailed description, reference is occasionally made to a tenant or user as having been detected and identified while within an information portal 16a-n. It is understood, however, that it is the mobile processing-system 18, and not the tenant or user, that is in fact being detected and identified.

Referring now to FIG. 2, a first stationary transceiver 36a maintains a first information portal 38a at the entrance to the parking lot 32. As the tenant drives through this first information portal 38a, the local server 12 identifies the mobile processing-system 18 and notes a time-of-entry to be used later for calculating an appropriate parking fee.

After a few minutes, the tenant parks and begins to walk toward a nearby elevator lobby 40. At time $t_2$, as the tenant approaches the elevator lobby 40, he enters a second information portal 38b maintained by a second stationary transceiver 36b. When the tenant enters this second information portal 38b, the second stationary transceiver 36b establishes communication between the local server 12 and the tenant's mobile processing-system 18. The local server 12 records the floor on which the tenant has parked. This data is later retrieved and used to program the elevator when the tenant reenters an elevator at the end of the day. The local server 12 then interacts with the elevator control system 22 to call an elevator 42. By the time the tenant reaches the elevator lobby 40, the elevator 42 is already well on its way to meeting him.

The local server 12 also determines the floor that the tenant works on and, in a further interaction with the elevator control system 22, instructs the elevator 42 to proceed to that floor once the tenant enters a third information portal 38c maintained by a third stationary-transceiver 36c within the elevator 42. The local server 12 then interacts with the building environmental-control-systems 28 to turn on heat or air-conditioning at locations selected on the basis of the tenant's identity.

When the elevator 42 arrives to pick up the tenant at the designated floor of the parking garage, the local server 12 starts a timer. If the tenant fails to enter the third information portal 38c (located in the elevator 42) within a selected time, the local server 12 sends a message to building security personnel alerting them to the possibility of a mishap.

At time $t_3$, the tenant enters the third information portal 38c by boarding the elevator 42. The third stationary-transceiver 36c in the elevator 42 detects the tenant's entry into the third information portal 38c. Without further intervention from the tenant, the elevator 42 then carries the tenant to the floor selected by the local server 12.

After a few moments, the elevator reaches the selected floor 42, whereupon the tenant exits the elevator 42. At time $t_4$, the tenant enters a fourth information portal 38d maintained by a fourth stationary transceiver 38d. The local server 12 detects the tenant's entry into the fourth information portal 38d and sends an appropriate message to the building security system 24. In response, the building security system 24 unlocks an appropriate door 44 for the tenant.

In the unlikely event that the elevator 42 becomes stuck between floors, the elevator control system 22 detects the existence of this condition and signals the local server 12. The local server 12 then checks to see if there are any occupants within the information portal maintained in the elevator 42. If there are such occupants, the local server 12 uses the information portal maintained in the elevator 42 to provide a real-time communication link between the occupants and building security personnel. The communication link can be a streaming video or audio link. Preferably, the communication link thus established is a two-way video link.

The communication system 10 can also be used to broadcast announcements and other data directly to the mobile processing-system 18. In such a case, a tenant enters any one of several information portals scattered throughout the building 34 while carrying a mobile processing-system 18. Upon entry into any such information portal, the local server transmits appropriate data to the mobile processing-system 18.

Figure 3:
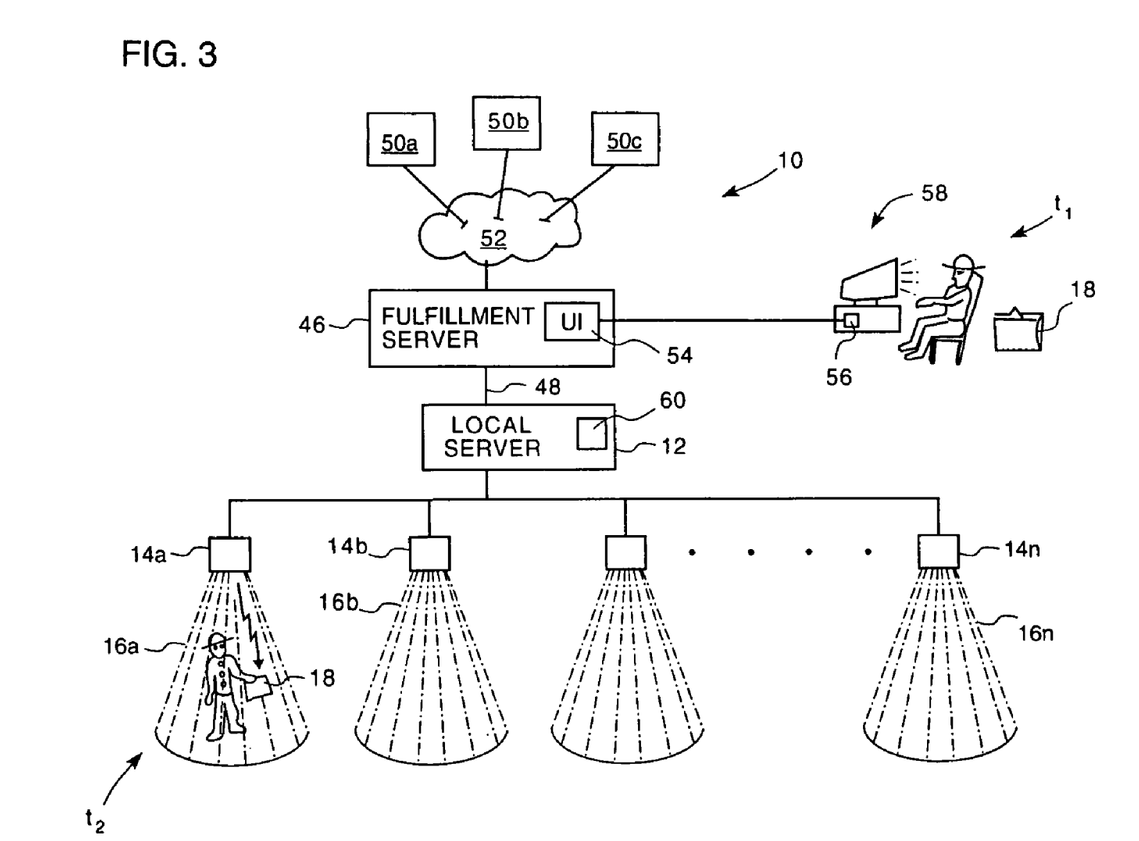
FIGS. 3 and 4 show additional communication systems incorporating the invention.

Another embodiment, shown in FIG. 3, also includes a fulfillment server 46 that interfaces the local server 12 with selected content providers 50a-c across a global computer network 52. The fulfillment server 46 communicates with the local server 12 over a private network 48 or a virtual private network. Data transport over the private network 48 can be carried out using a frame relay or xDSL service.

The addition of the fulfillment server 46 to the communication system permits the local server to relay information gathered by the fulfillment server 46 to a user whenever that user enters one of many information portals dispersed throughout a building 34. A user-interface 54 associated with the fulfillment server 46 enables a user to request delivery of selected information from the content providers to the user's mobile processing-system 18.

To illustrate the types of services that can be provided, it is useful to consider a user who wants to obtain a traffic report at the end of every working day. The activities of such a user are illustrated in FIG. 3.

At time $t_1$, the user accesses the user-interface 54 of the fulfillment server 46 using a web-browser 56 executing on the user's computer system 58. Through this user-interface 54, the user instructs the fulfillment server 46 to routinely make a traffic report available everyday.

At an appropriate time, and without further intervention by the user, the fulfillment server 46 retrieves traffic information from a content provider 50a. The fulfillment server 46 then identifies the local server 12 associated with that particular user. After doing so, the fulfillment server 46 sends the requested information to that local server 12. The local server 12 then stores that information in a cache 60 for delivery to the user's mobile processing-system 18 upon entry of that system into an information portal 16a-n.

At time $t_2$, while the user is in the elevator 42, the user enters or passes through an information portal while carrying the mobile processing-system 18. The stationary transceiver 14a maintaining that information portal sends a message to the local server 12 indicating the presence of the user's mobile processing-system 18. In response, the local server 12 retrieves the requested information from cache and sends it to the stationary transceiver 14a. The stationary transceiver 14a then transmits that data directly to the mobile processing-system 18. In this way, by the time the user leaves the information portal 16a, the mobile processing-system 18 will have collected the desired data.

The foregoing example illustrates the manner in which the communication system 10 provides programmed services. Such programmed services are characterized by a request that particular content be made available for delivery during a particular time interval. However, the communication system 10 can also provide real-time services. Real-time services are characterized by the delivery of a message indicating that a particular event has occurred.

To illustrate the use of the communication system 10 in providing real-time service, consider a user who wants to be alerted when, for example, a price of a particular stock has risen above a pre-determined level. The user would then access the user-interface 54 of the fulfillment server 46 using a web-browser 56 executing on the user's computer system 58. Upon doing so, the user could then request that the share price of a stock be monitored and that a message be sent if the share price reaches or exceeds the pre-determined level.

In response to the user's instruction, the fulfillment server 46 periodically accesses one or more of the selected content providers 50a-50c throughout the day to monitor the price of the stock. If the price exceeds the pre-determined threshold, the monitor sends a message to the local server 12 associated with the user. The local server 12 then caches this message for subsequent delivery to the user whenever the user enters an information portal 16a-n while carrying a mobile processing-system 18.

When the user carries the mobile processing-system 18 into an information portal 16a, the local server 12 detects the presence of the mobile processing-system 18, retrieves the message from cache, if any, and transmits it to the mobile processing-system 18.

A communication system 10 as described herein can also provide interactive services to a user. For example, the local server 12 can provide information such as locations of nearby restaurants, automated teller machines, train stations, and other services. Such a service is useful for travelers who are unfamiliar with the immediate neighborhood. In this case, the user need not interact with a fulfillment server 46 beforehand. Such information can be available upon request whenever a user carrying a mobile processing-system 18 enters an information portal 16a.

Although the foregoing description teaches a communication system 10 installed in a building, such as an office building or a hotel, similar communication systems can be installed virtually anywhere that a person carrying a mobile processing-system 18 can be expected to linger momentarily. For example, communication systems of the type described herein can also be installed at such diverse locations as airports, train stations, train cars, and cruise ships.

Figure 4:
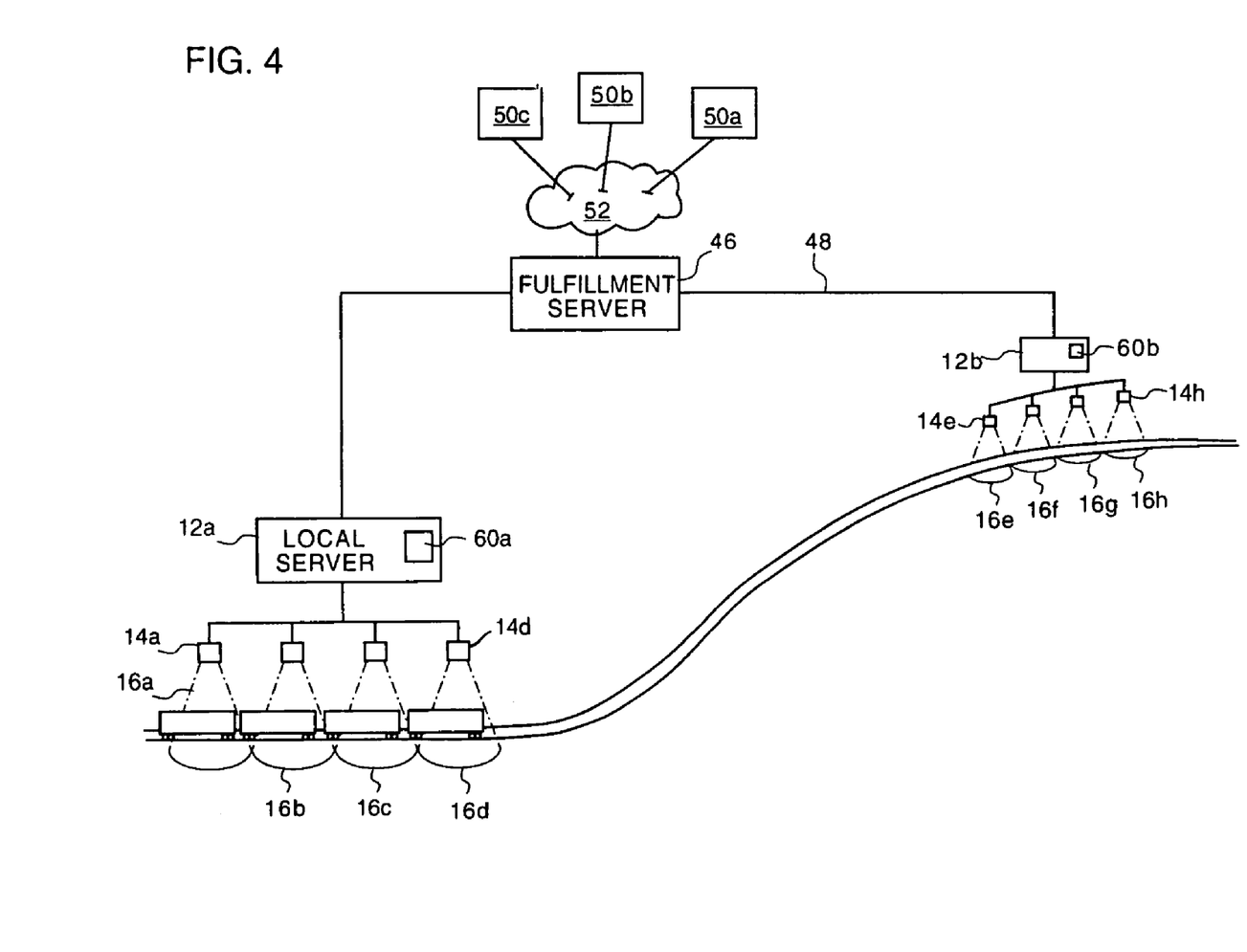

A user of the communication system 10 need not be confined to a particular local server 12. For example, a communication system 10 can be installed to encompass a set of train stations, each of which has its own local server 12, as shown in FIG. 4.

In this application, each train station (of which only two are shown in the figure) includes a local server 12a-b having a local cache 60a-b. The first local server 12a provides a link between four stationary transceivers 14a-d at a first train station and a fulfillment server 46. The second local server 12b provides a link between four additional stationary transceivers 14e-h at a second train station and the fulfillment server 46. The fulfillment server 52 provides a link to a plurality of content providers 50a-c across a global computer network 52. It is understood that the number of stationary transceivers in each train station and the number of train stations can be varied without departing from the scope of the invention.

When a local server 12a detects the user at the train station or entering the train, a link is established in the manner already described in connection with FIGS. 1 and 3, would be delivered as already described above. For interactive services, such as email, or for extended services, such as music, the local server 12 would accept the request, cache it, and wait for the next train station to complete the request. The user would then be notified when the information becomes available.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What I claim as new, and secured by letters patent is:

1. A communication system comprising:
   a stationary transceiver defining an information portal in a vicinity thereof, the stationary transceiver being disposed at a location selected from the group consisting of an elevator, a building lobby, and a vehicle; and
   a local server in communication with said transceiver, said local server being configured
      to respond to entry of a mobile processing-system present within said information portal, and
      to provide, to said mobile processing system, data previously requested for said mobile processing system prior to entry of said mobile processing system into said information portal.

2. A communication system comprising a stationary transceiver defining an information portal in a vicinity thereof;
   a local server in communication with said transceiver, said local server being configured
      to identify and respond to a mobile processing-system present within said information portal, and
      to perform a function on the basis of the identity of said mobile processing-system, said function being selected from the group consisting of:
         permitting building access to a portion of said building; and
         controlling an elevator in said building.

3. The communication system of claim 2, further comprising an access control unit in communication with said local server, said access control unit being controlled by said local server on the basis of the identity of said mobile processing-system.

4. The communication system of claim 1, wherein said stationary transceiver is selected from the group consisting of a radio transceiver, an optical transceiver, an infrared transceiver, and an acoustic transceiver.

5. The communication system of claim 1, wherein said local server and said stationary transceiver are in communication across a local area network.

6. The communication system of claim 1, wherein said local server and said stationary transceiver are in wireless communication across a local area network.

7. The communication system of claim 1, further comprising a fulfillment server in communication with said local server, said fulfillment server having access to a wide area network.

8. The communication system of claim 7, wherein said local server comprises a cache for temporary accumulation of information from said fulfillment server to be relayed to said mobile processing system.

9. The communication system of claim 7, wherein said wide area network comprises a global computer network.

10. The communication system of claim 7, wherein said fulfillment server includes a user-interface for enabling a user to cause said fulfillment server to collect selected information.

11. The communication system of claim 10, wherein said fulfillment server is configured to provide said selected information to said local server when said local server identifies, within said information portal, a mobile processing unit associated with said user.

12. The communication system of claim 10, wherein said fulfillment server includes a user-interface for enabling a user to cause said fulfillment server to detect an occurrence of a condition.

13. The communication system of claim 12, wherein said fulfillment server is configured to provide information indicative of an occurrence of said condition to said local server when said local server identifies, within said information portal, a mobile processing unit associated with said user.

14. The communication system of claim 12, wherein said fulfillment server is configured to provide interactive services to said mobile processing unit.

15. A communication system comprising:
    a plurality of stationary transceivers, each configured for wireless communication with a mobile processing system present in a corresponding information portal, the stationary transceivers being disposed at locations selected from the group consisting of an elevator, a building lobby, and a vehicle; and
    a server system in communication with each of said stationary receivers, said server system having a link to a global computer network and thereby providing said mobile processing system with wireless access to said global computer network said server system including a server configured to provide, to said mobile processing system, in response to entry of said mobile processing system into an information portal, data previously requested for said mobile processing system prior to entry of said mobile processing system into said information portal.

16. A method for providing a mobile processing system with wireless access to a global computer network, said method comprising:
    maintaining an information portal, the information portal being disposed at a location selected from the group consisting of an elevator, a building lobby, and a vehicle;
    establishing wireless communication between said mobile processing system and a server system following entry of said mobile processing system into said information portal; and
    causing data previously requested for said mobile processing system prior to entry of said mobile processing system into said information portal to be provided to said mobile processing system, in response to entry of said mobile processing system into said information portal.

17. A communication system comprising:

a stationary transceiver defining an information portal in a vicinity thereof, the stationary transceiver being disposed at a location selected from the group consisting of an elevator; and a local server in communication with said transceiver, said local server being configured
- to respond to entry of a mobile processing-system present within said information portal, and
- to provide, to said mobile processing system, data previously requested for said mobile processing system prior to entry of said mobile processing system into said information portal.

18. A communication system comprising:

a stationary transceiver defining an information portal in a vicinity thereof, the stationary transceiver being disposed at a location selected from the group consisting of a building lobby; and a local server in communication with said transceiver, said local server being configured
- to respond to entry of a mobile processing-system present within said information portal, and
- to provide, to said mobile processing system, data previously requested for said mobile processing system prior to entry of said mobile processing system into said information portal.

19. A communication system comprising:

a stationary transceiver defining an information portal in a vicinity thereof, the stationary transceiver being disposed at a location selected from the group consisting of a vehicle; and a local server in communication with said transceiver, said local server being configured
- to respond to entry of a mobile processing-system present within said information portal, and
- to provide, to said mobile processing system, data previously requested for said mobile processing system prior to entry of said mobile processing system into said information portal.

* * * * *